Feb. 2, 1965 W. W. BAYRE ETAL 3,168,659
VARIABLE FOCUS TRANSDUCER
Filed Jan. 11, 1960

INVENTOR.
Willard W. Bayre &
BY Norman W. Schubring

Paul J. Ethington
ATTORNEY

United States Patent Office 3,168,659
Patented Feb. 2, 1965

3,168,659
VARIABLE FOCUS TRANSDUCER
Willard W. Bayre, West Orange, N.J., and Norman W. Schubring, Hazel Park, Mich., assignors to General Motors Corporation, Detroit, Mich., a corporation of Delaware
Filed Jan. 11, 1960, Ser. No. 1,665
1 Claim. (Cl. 310—8.3)

This invention relates to apparatus for producing a concentrated beam of ultrasonic energy.

In ultrasonic testing or inspection apparatus, it is sometimes desirable to provide a concentrated beam of ultrasonic energy having a small cross-sectional area due to the fact that the resolving power of the inspection apparatus is usually a function of this area. A small cross-sectional area can be provided by reducing the transducer size, but this would result in undesirable effects in that the energy in the beam would be reduced and also the beam would tend to spread out in a spherical manner as the transducer would become, in effect, a point source. Thus it is necessary to provide a large source which produces an ultrasonic beam having a plane wave front and then focus this beam to produce the desired small cross-section. Existing mechanical means for focusing a beam of ultrasonic energy are not adequate in that no convenient means are provided for varying the degree of focusing and in that the apparatus is complex and expensive.

It is, therefore, the principal object of this invention to provide means for producing a high energy, concentrated beam of ultrasonic energy. It is a further object to provide a means for variably focusing a beam of ultrasonic energy.

In accordance with this invention a flexible membrane is disposed between two sonic propogation media. The pressure exerted by one medium against the membrane is adjustable relative to the pressure exerted by the other medium against the membrane. Thus the membrane will yield to form a curved surface having a radius of curvature dependent upon the difference in pressure exerted by the two media. If a beam of ultrasonic energy is directed through the membrane the rays will converge or diverge, dependent upon the curvature of the membrane and the difference in the sonic propagation velocities of the two media. Means are provided for adjusting the pressure differential so that the degree of focusing may be conveniently varied.

The novel features which are believed to be characteristic of the invention are set forth with particularity in the appended claim. The invention itself, however, both as to its organization and method of operation, together with further objects and advantages thereof, may best be understood by reference to the following description, taken in conjunction with the accompanying drawing, in which:

Figure 1:
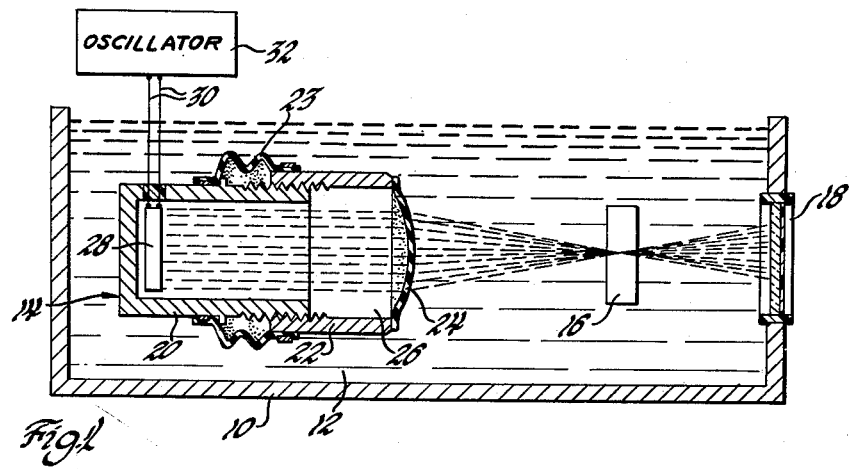
FIGURE 1 is a diagram of ultrasonic testing apparatus incorporating the invention.

Referring now to the drawing, and more particularly to FIGURE 1, ultrasonic testing apparatus is illustrated employing a variable focus transducer assembly. A vessel 10 is adapted to contain a sonic propagating liquid 12 which may conveniently take the form of water. Submerged within the liquid 12 is a transducer assembly 14 that is adapted to produce a concentrated ultrasonic beam to be directed toward a target such as the test specimen 16 which may be a metallic casting wherein flaws are desired to be detected. A means for detecting, observing, or measuring the ultrasonic beam after it has passed through the test specimen 16 is disposed on the opposite side thereof. A convenient device for observing and measuring ultrasonic energy is an image cell 18 as is described in the co-pending U.S. application Serial No. 860,237, which is assigned to the assignee of the present invention.

The transducer assembly 14 is comprised of a cylinder 20 which is closed on one end and is screw threaded on the opposite end. An annular mounting ring 22 having screw threads adapted to engage the threads on the cylinder 20 is positioned thereon and adapted to be axially movable with respect thereto. A fluid seal 23 is utilized to prevent liquid from leaking past the juncture of the cylinder 20 and the ring 22. A flexible membrane 24, composed of rubber, plastic or other suitable resilient material, is secured to the ring 22 by cement or other convenient means. The membrane 24 closes off the open end of the cylinder 20. The interior 26 of the cylindrical transducer assembly 14 is filled with a liquid which may be alcohol or kerosene or other fluid having a sonic propagation velocity differing from that of the liquid 12.

An electro-mechanical transducer 28 is disposed within the cylinder 20 and preferably takes the form of a quartz crystal adapted to emit an ultrasonic beam having a plane wave front and in a direction or propagation parallel to the axis of the cylinder 20. The transducer 28 is connected by a pair of conductors 30 to an oscillator 32 which produces an electrical signal for driving the transducer 28 at the desired frequency.

In the operation of the apparatus shown in FIGURE 1, the transducer 28, driven by the oscillator 32, directs a beam having a plane wave front through the membrane 24. If the membrane 24 is thin compared to the wave length of the ultrasonic energy, the membrane will define an interface between the liquid in the interior 26 and the liquid 12. The rays will converge as shown in FIGURE 1 if the sonic propagation velocity of the liquid in the interior 26 is less than that of the liquid 12 and if the membrane 24 flexes outward. The radius of curvature may be varied by turning the ring 22 with respect to the cylinder 20 and in so doing a different focusing effect will be obtained as illustrated in FIGURES 2 and 3.

Figure 2:
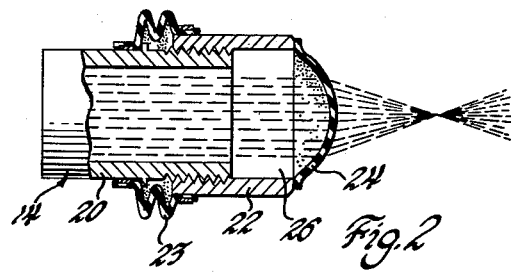
FIGURE 2 is an illustration of the transducer assembly of the apparatus of FIGURE 1 modified to produce a different degree of focusing.
Figure 3:
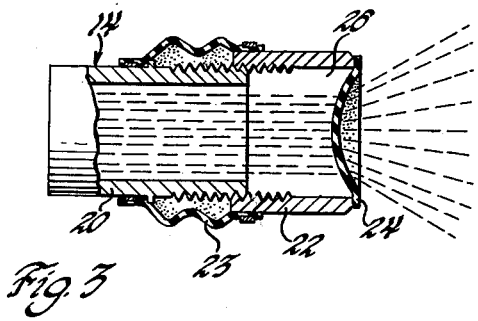
FIGURE 3 is an illustration of the transducer assembly of FIGURE 1 in a further modified form.

In FIGURE 2 it is shown that a radius of curvature shorter than that shown in FIGURE 1 will produce a greater degree of convergence or a shorter focal length for the ultrasonic beam. FIGURE 3 shows that if the ring 22 is moved outwardly for a sufficient distance, the membrane 24 will be concave and the rays will diverge rather than converge. This effect might be desirable when inspecting a test specimen having a curved surface which would itself produce a converging effect on the beam. It should be noted that the present invention not only provides improved resolution due to the small cross-section of the beam, but also provides increased sensitivity due to the high intensity in the critical region of the test specimen while the intensity in regions axially displaced from the critical region is much lower.

While there has been illustrated a particular embodiment of the invention, it will of course be understood that the invention is not limited thereto since various modifications may be made, and it is contemplated that the appended claim will cover any such modifications as fall within the true spirit and scope of the invention.

We claim:

Apparatus for focusing a beam of ultrasonic energy toward a target comprising a cylindrical housing having an open end and a closed end, a first liquid surrounding the housing, a transducer disposed within the housing for directing a beam of ultrasonic energy axially through the housing toward the open end, a ring member mounted on the open end of the housing and axially movable with respect thereto, sealing means engagingly disposed about the juncture between the housing and the ring member for providing a fluid tight seal therebetween, said sealing means being flexible to permit axial displacement between the housing and ring member, a flexible membrane mounted on the ring member to close off the open end of the housing, a target disposed in the first liquid and spaced from the membrane, and a second liquid located within the housing and having a sonic propagation velocity differing from that of the first liquid whereby the membrane defines an interface between the first and second liquids having a curvature which is variable in accordance with the axial displacement of the ring member with respect to the housing.

References Cited in the file of this patent

UNITED STATES PATENTS

| | | |
|---|---|---|
| 1,563,626 | Hecht et al. | Dec. 1, 1925 |
| 1,624,412 | Horton | Apr. 12, 1927 |
| 2,398,117 | Rost et al. | Apr. 9, 1946 |
| 2,398,815 | Turner | Apr. 23, 1946 |
| 2,452,068 | Peterson | Oct. 26, 1948 |
| 2,532,507 | Meunier | Dec. 5, 1950 |
| 2,545,101 | Meunier | Mar. 13, 1951 |
| 2,561,368 | Hayes et al. | July 24, 1951 |
| 2,715,189 | Ots | Aug. 9, 1955 |
| 2,913,602 | Joy | Nov. 17, 1959 |

FOREIGN PATENTS

| | | |
|---|---|---|
| 494,971 | Canada | Aug. 4, 1953 |